United States Patent [19]

Lambert

[11] Patent Number: 4,576,050
[45] Date of Patent: Mar. 18, 1986

[54] THERMAL DIFFUSION FLUID FLOW SENSOR

[75] Inventor: David K. Lambert, Sterling Heights, Mich.

[73] Assignee: General Motors Corporation, Detroit, Mich.

[21] Appl. No.: 645,253

[22] Filed: Aug. 29, 1984

[51] Int. Cl.$^4$ .................. G01F 1/68; G01P 5/10
[52] U.S. Cl. ..................... 73/861.05; 73/204
[58] Field of Search ............... 73/204, 861.05

[56] References Cited

U.S. PATENT DOCUMENTS

| | | | |
|---|---|---|---|
| 3,922,912 | 12/1975 | Badbury et al. | 73/204 |
| 4,332,157 | 6/1982 | Zemel et al. | 73/204 X |
| 4,345,465 | 8/1982 | Gruner et al. | 73/204 |
| 4,373,386 | 2/1983 | Schuddemat et al. | 73/204 X |
| 4,478,077 | 10/1984 | Bohrer et al. | 73/204 |
| 4,498,337 | 2/1985 | Gruner | 73/204 |

FOREIGN PATENT DOCUMENTS 2934565  3/1981  Fed. Rep. of Germany ........ 73/204

Primary Examiner—Herbert Goldstein
Attorney, Agent, or Firm—Warren D. Hill

[57] ABSTRACT

A miniature solid state fluid flow sensor has a low diffusivity substrate, such as a polymer film, which is optionally mounted on a thermally conductive base. A resistor strip on the substrate is connected to an electrical oscillator and thus emits thermal waves which are propagated through the fluid at a rate dependent on a fluid flow component perpendicular to the strip. A thermoelectric detector, spaced from one side or each side of the strip, senses the thermal waves; and detector circuitry determines the time or phase shift due to fluid flow.

10 Claims, 8 Drawing Figures

THERMAL DIFFUSION FLUID FLOW SENSOR

This invention relates to a fluid flow sensor and particularly to such a sensor responsive to thermal signals propagated through the fluid.

Many types of fluid flow sensors have been proposed which cumulatively represent a great variety of advantages and disadvantages. For example, there are wide ranges of size, expense, accuracy, response, power requirements, and durability. In addition, certain sensors are suitable only for limited types of fluids, or for limited temperature ranges. Some sensors are responsive only to fluid velocity, while others respond to fluid mass flow. For the application of measuring mass air flow of automotive engine induction air, it is desirable that the sensor respond to mass air flow and it is required that the sensor be rugged and durable and useful throughout a wide temperature range and a wide dynamic flow range.

Flow sensors which respond to thermal properties usually operate on the basis of measuring the cooling effect of a flowing fluid on a heated solid. These sensors have taken many forms including hot wire and thin film air flow sensors which have been applied to the mass air flow measurement of engine induction air. An example of the latter is disclosed in U.S. Pat. No. 4,433,576 Shih et al; an example of a miniature solid state air flow sensor is the pyroelectric anemometer shown in U.S. Pat. No. 4,332,157 Zemel et al. In the Zemel et al device, temperature oscillations flowing primarily through a solid substrate cause temperature variations which depend on the cooling effect of the air flow on the substrate. Very slow response times are reported for the pyroelectric device. Still another temperature responsive air flow device is the pulsed hot wire anemometer which measures air flow using the time difference between the heating of one wire and the detection of the resulting burst of hot air by a resistance change in a second wire spaced from the first. While this is based on the propagation of thermal signals through the air and thus is closely related to the present invention, it requires thin wires which are fragile and which are difficult to assemble in a reproducible way.

It is therefore an object of the invention to provide a fluid flow sensor having a miniature solid state sensing element and having rapid response time. It is another object of the invention to provide such a sensor which is readily incorporated in a solid state integrated circuit chip. It is a further object to mass air flow and is operative over the temperature and provide such a fluid flow sensor which is responsive to flow ranges required for automotive engine induction air flow measurements.

The invention is carried out by a solid state fluid flow sensor having a substrate with a thermal diffusivity less than that of the fluid being measured, a source of thermal oscillations and detector of thermal oscillations on the substrate surface such that thermal oscillation signals are propagated through the fluid between the source and detector, and circuitry for measuring the time of arrival or phase of the signal from the detector relative to a suitable reference, which time or phase correlates to the fluid flow near the substrate surface.

The above and other advantages of the invention will become more apparent from the following description taken in conjunction with the accompanying drawings, wherein.

While the fluid flow sensor described herein is generally applicable to gases and liquids, it is specifically described in its preferred embodiment as a mass air flow sensor. Thus, it is designed to produce an output which responds not only to air velocity across the face of the sensor, but to density as well so that for some predefined airstream the sensor output will represent mass air flow.

Figure 1:
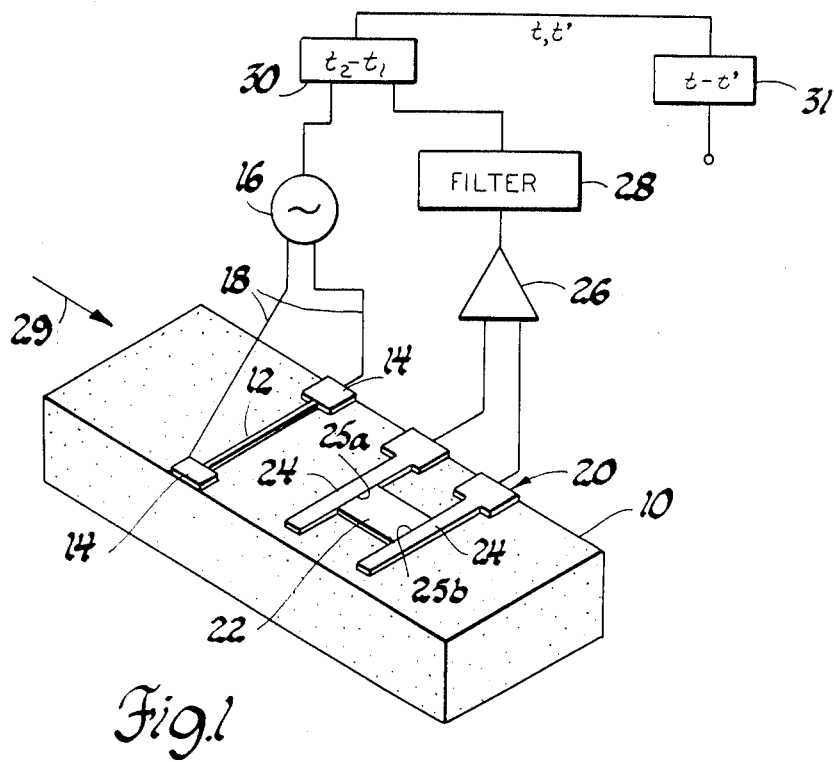
FIG. 1 is a schematic illustration of a simplified embodiment of a fluid flow sensor according to the invention.

Referring to FIG. 1, a sensor requires a substrate 10 which is a thermal and electrical insulator and which has low thermal diffusivity relative to the air or other fluid being measured. The thermal diffusivity A is defined as: $A = K/DC_p$, where K is the thermal conductivity, D is the density, and $C_p$ is the heat capacity at constant pressure. A suitable material for the substrate 10 is glass which at 20° C. has a thermal conductivity, $K = 1.1 \times 10^{-2}$ W cm$^{-1}$°C$^{-1}$, and a thermal diffusivity, $A = 6.9 \times 10^{-3}$ cm$^2$ Sec$^{-1}$. An even better substrate material is Mylar® which has the properties: $K = 1.45 \times 10^{-3}$ W cm$^{-1}$ °C$^{-1}$, and $A = 9.3 \times 10^{-4}$ cm$^2$ Sec$^{-1}$, or polyimide which has thermal properties similar to Mylar at 20° C. By comparison, the thermal properties at 20° C. of air are: $K = 2.61 \times 10^{-4}$ W cm$^{-1}$ °C.$^{-1}$, and $A = 2.31 \times 10^{-1}$ cm$^2$ Sec$^{-1}$. Thus these substrate materials have a much lower thermal diffusivity than the air. A source of temperature oscillations in the form of a resistive strip or heater 12 extends across the surface of the substrate 10 and terminates at a conductive pad 14 at either end. An electrical oscillator 16 is connected to the terminal pads 14 by leads 18 to supply oscillating current to the resistive strip or heater 12. A detector of temperature oscillations in the form of a thermoelectric detector 20 is formed on the surface of the substrate 10, spaced from the resistive strip 12. The thermoelectric detector 20 comprises a thin film of semiconductive material 22, such as lead telluride, and a pair of metal (e.g., lead) strips 24 both parallel to the resistive strip 12 contacting the surface of the semiconductor film 22 to form two spaced elongated junctions 25a and 25b with the film and to provide output terminals for the detector 20. The Seebeck effect determines the operation of the detector 20 so that an electrical signal is generated at the detector output terminals whenever the two junctions 25a and 25b of the detector are at different temperatures. A differential amplifier 26, having its inputs coupled to the metal strips 24 of the detector 20, produces an output signal whenever such a temperature differential occurs. That output signal is passed through a filter 28 which is set to pass a frequency twice that of the oscillator 16 since each sine wave cycle of the oscillator 16 will produce two heat pulses in the resistive strip 12 and will give rise to two detector output pulses. The filtered output signal and a signal from the oscillator 16 are fed to a timing circuit 30 which is sensitive to the time differential or the phase difference between the oscillator current and the detector output signal.

The rate of propagation of the thermal wave through the air from the source of temperature oscillations 12 to the detector 20 depends upon the phase velocity, $V_p$, of the temperature oscillations and the component of air velocity (indicated by arrow 29) perpendicular to the strip 12. A simple analysis yields the relationship of the fluid flow velocity to the time shift or phase shift caused by flow. Where R is the distance from the source 12 downstream to the first junction 25a of the detector 20, the time t for the phase front to move from the source to the detector junction 25a through still air is: $t = R/V_p$. With downstream flow velocity $V_f$, the time $t' = R/(V_p + V_f)$. The time shift then is $t - t'$; and the resulting phase shift in degrees—where f is the temperature oscillation frequency—is $360\ fRV_f/V_p(V_p + V_f)$. The resulting function has a shape like the curve shown in FIG. 2, and is characterized by a linear portion at velocities. The timing circuit 30 yields the value of low velocities and a nearly level portion at high t or t'. The FIG. 2 data is obtained by making a measurement of t in still air and making many measurements of t' at various air-flow rates. The value $t - t'$, representing time shift or the corresponding phase shift, is manually or electronically determined by a calculation at each data point, as indicated by the calculation circuit 31 of FIG. 1.

Since temperature oscillations can propagate from the source to the detector through the substrate as well as through the air, the design of the device must take that into account as a possible source of interference at the detector. Since the thermal conductivity of the substrate is typically greater than that of air, more heat will be coupled from the resistive strip 12 to the substrate than to the air so that if the detector 20 were very close to the resistive strip 12, the thermal oscillation in the substrate would be predominant over that in the air and there would be a very low signal-to-noise ratio. On the other hand, since the thermal diffusivity of the air is substantially greater than that of the substrate, the thermal oscillations in the air are much more efficiently propagated away from the source 12. The amplitude of the thermal oscillations in the air decreases with the distance R from the source, however an even greater rate of decrease occurs in the substrate so that there is a cross-over point at which the thermal oscillation effects of the air and substrate are equal; at greater distances from the source, the thermal oscillations in the air have the predominant effect. The detector 20 is preferably placed near the cross-over point; that is, the detector junction 25a nearest the thermal oscillation source 12 is sensitive to the thermal oscillations carried by the air as well as by the substrate, however, the effect of air flow on the detector output signal is measurable. The second junction 25b of the detector 20 is even farther from the source 12 and even though the detector output signal depends upon the temperature difference of the two junctions 25a, 25b, the thermal oscillations at the second junction 25b are so greatly diminished in amplitude that they cause only minor perturbations in the detector output signal. Although the measured time or phase depends on several factors in addition to the variable air flow, it is not necessary to determine the particular influence of each factor because the device is repeatable in operation. By calibrating a particular device to determine the relationship between flow and the time or phase shift of the detected signal, as shown in FIG. 2, flow measurements are thereafter readily made for that device and other devices of the same design.

Figure 2:
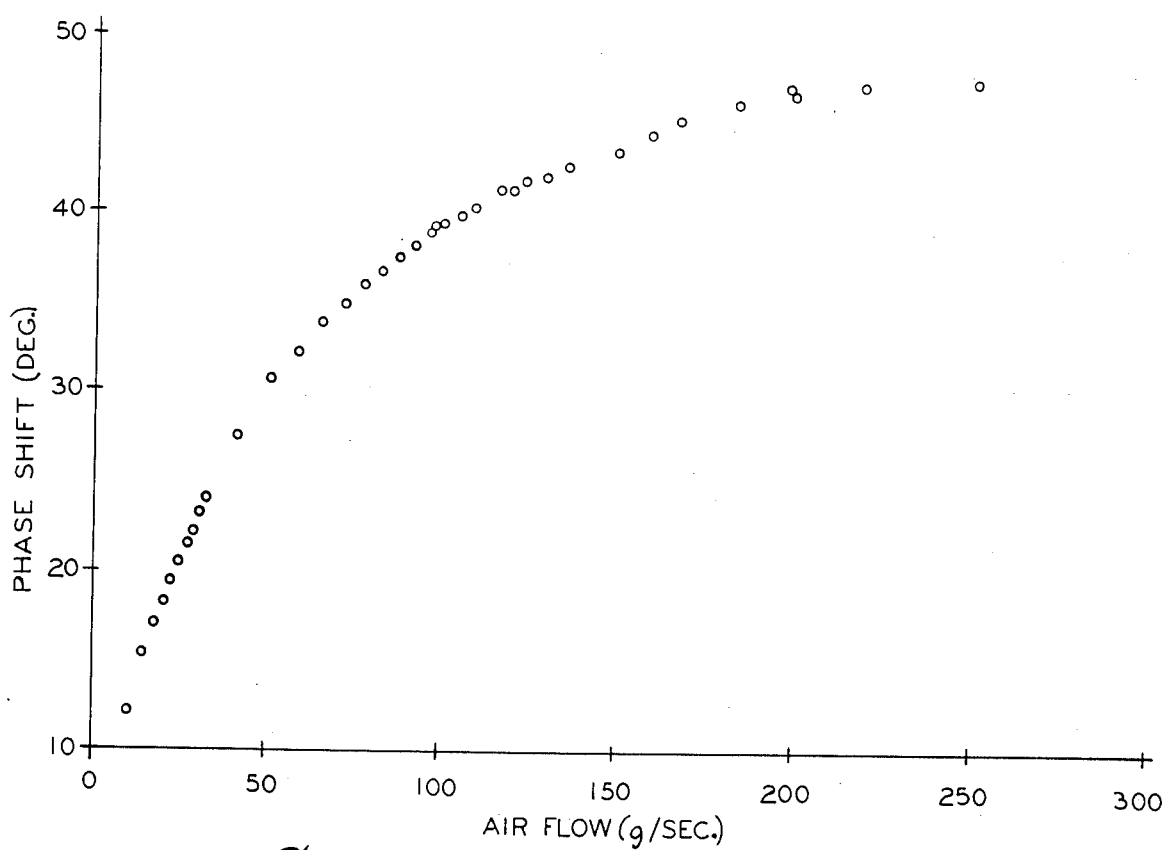
FIG. 2 is a graph of the measured phase shift vs. air flow obtained with a sensor according to the invention.
Figure 3:
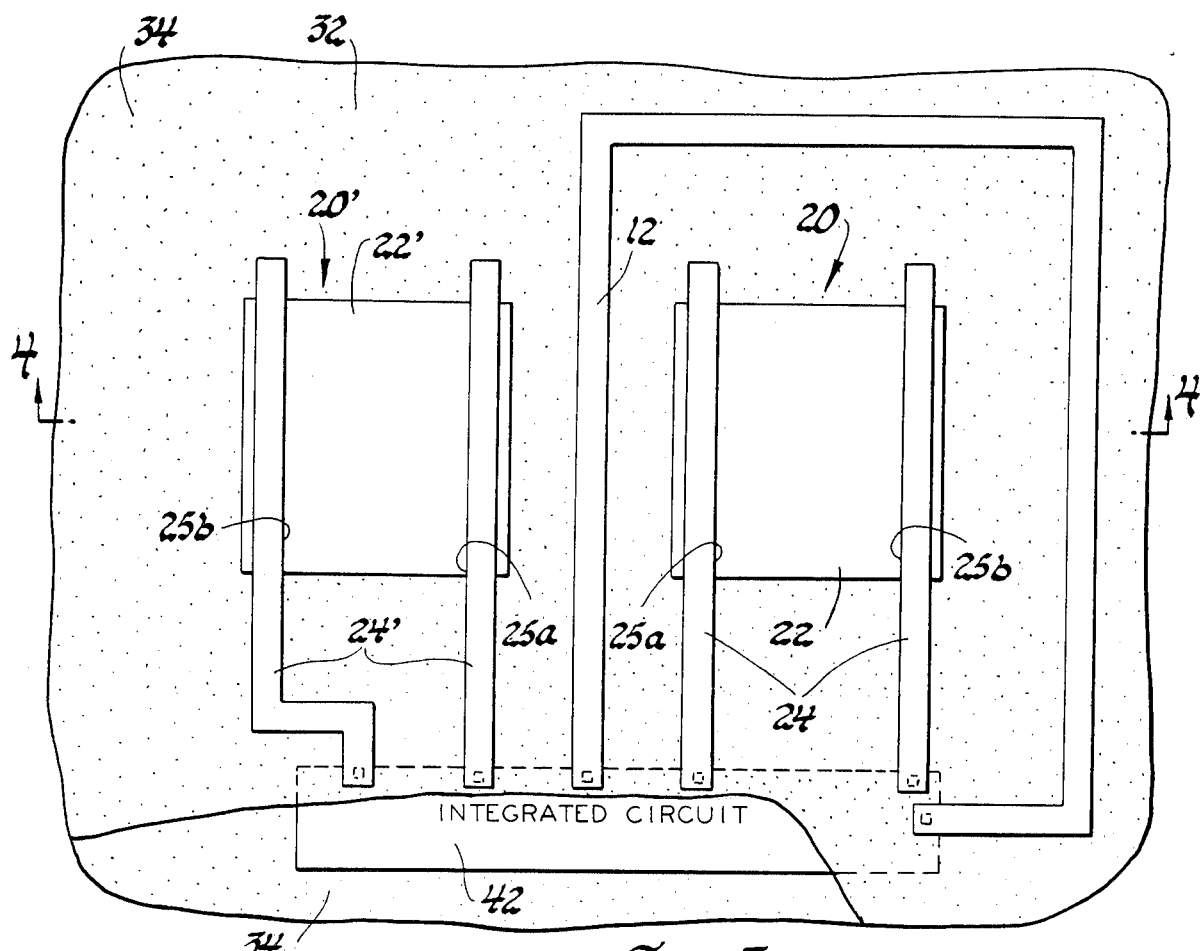
FIG. 3 is a partly broken away plan view of a second embodiment of the fluid flow sensor according to the invention.
Figure 4:
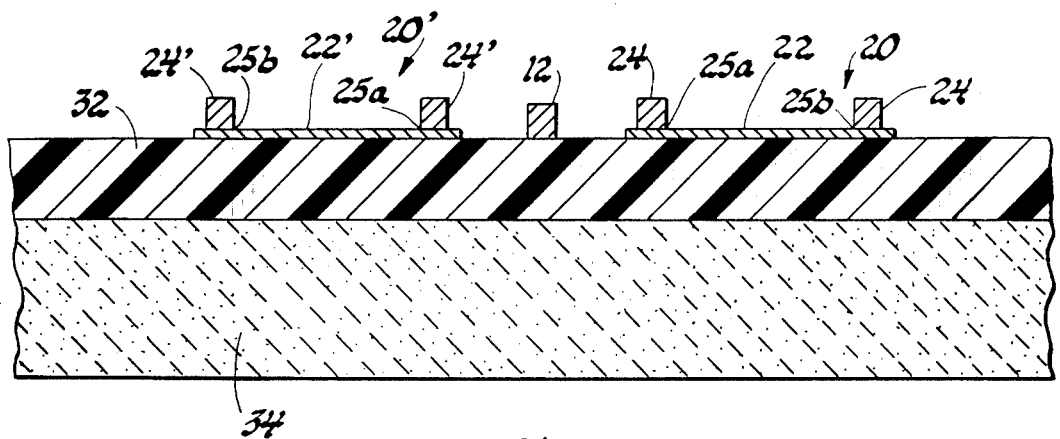
FIG. 4 is a cross-sectional view of the second embodiment taken along line 4—4 of FIG. 3.
Figure 5:
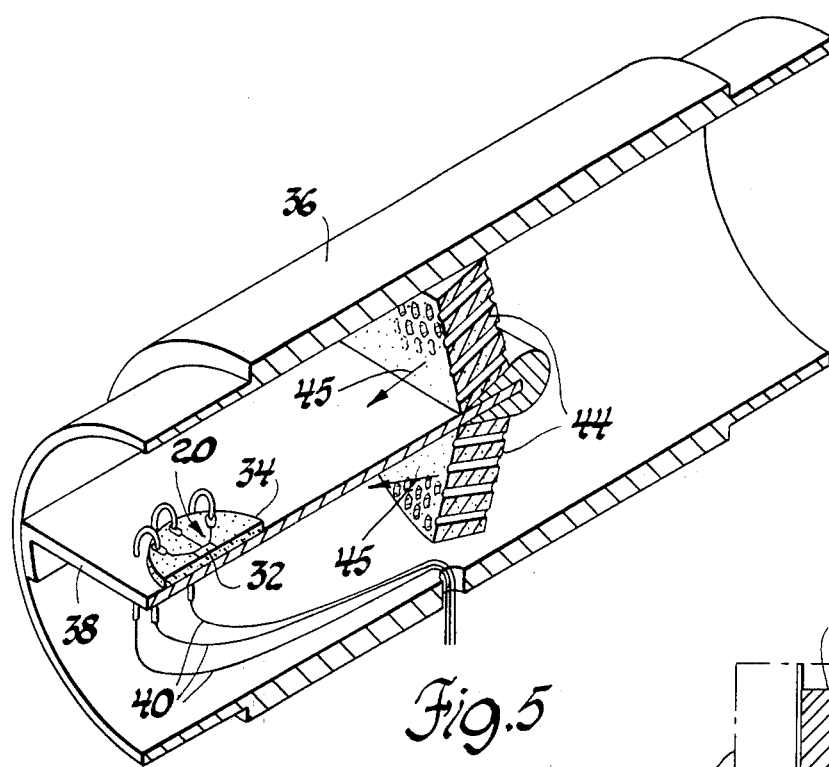
FIG. 5 is a partial cross-sectional view of an air flow meter installation incorporating a sensor according to the invention.

The air flow data of the graph of FIG. 2 was obtained by the specific device shown in FIGS. 3, 4, and 5—except that the integrated circuit 42 was not present, and the upstream detector 20' was not connected to the detector circuit. The circuit was connected in the manner of FIG. 1. The device was operated at 154 Hz thermal oscillation frequency. The device used a 16 micrometer thick polyimide substrate 32 mounted on a silicon base 34. As shown in FIG. 5, an air flow tube 36 having an inner diameter of 6 cm is bisected by a diametrically disposed plate 38 supported by its edges on the tube 36 inner wall. The silicon base 34 of the sensor is a 25 mm diameter silicon wafer mounted on the plate 38. Wire leads 40 extend from the sensor to an aperture in the wall of the tube 36. A pair of air deflectors 44 comprising honeycomb material mounted at an angle upstream of the sensor on either side of the plate 38 direct air flow (shown by arrows 45) at an angle to the plate 38 and to the sensor surface. The silicon base 34 has good thermal conductivity so that it serves as a heat sink for the sensor. Consequently, the overall temperature of the sensor and particularly the maximum source 12 temperature can be minimized for a large thermal oscillation amplitude of the source 12. Other conductive materials such as metals can be used for the base. The silicon base has the further advantage however of optionally including an integrated circuit 42 containing the oscillator 16, the detector amplifier 26, and the timing circuit 30—along with any other desired electronic support for the sensor.

In the embodiment of FIGS. 3 and 4, the substrate 32 supports the thermal oscillation source or resistive strip 12 midway between two thermal oscillation detectors 20 and 20'. The resistive strip 12 is formed of lead and is 56 micrometers wide and 1 micrometer thick. Each detector 20,20' comprises a lead telluride film 22,22' having a thickness of 0.2 micrometer and formed as a rectangle about 300 micrometers on a side. Lead conductors 24, 24' parallel to the resistive strip 12, are 7 micrometers wide and 1 micrometer thick and form junctions with the lead telluride film 22 or 22'. For each detector, the junctions 25a and 25b, are spaced apart by 254 micrometers, and the junction 25a nearest the resistive strip 12 is spaced 146 micrometers from the centerline of the strip.

Figure 6:
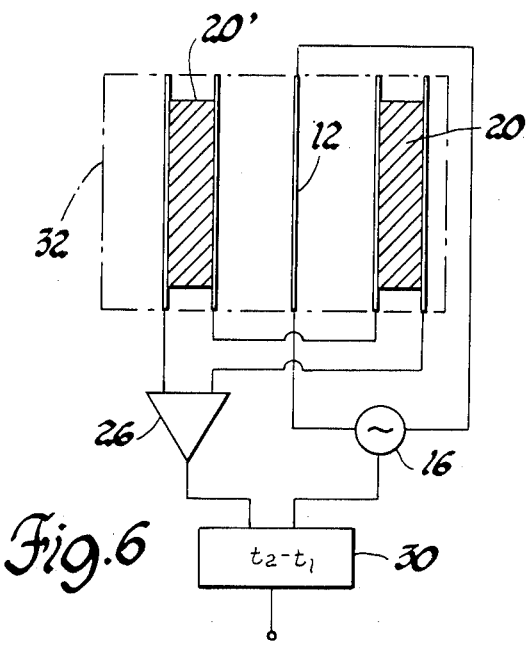
FIG. 6 is a schematic illustration of the FIGS. 3 and 4 embodiment of the invention.

Advantages of using two thermal oscillation detectors 20,20' which are serially connected to the amplifier 26 as shown in FIG. 6 to cancel equal output voltages of the detectors 20,20' are to make the sensor insensitive to linear temperature gradients in the air stream and in the substrate, thereby reducing noise or background signals. The detector signal results mainly from temperature oscillations passing through the air thereby increasing the signal from the detector. Detector signals resulting from thermal oscillations passing through the insulating substrate to the detectors tend to cancel since the thermal wave velocity in the substrate should be the same in both directions regardless of the air flow. The effect of the silicon or other thermally conductive base 34 is to reduce the static temperature of the device thereby allowing the maximum heat source temperature to be kept low while increasing the source temperature oscillation amplitude relative to that obtained with a homogeneous substrate.

Figure 7:
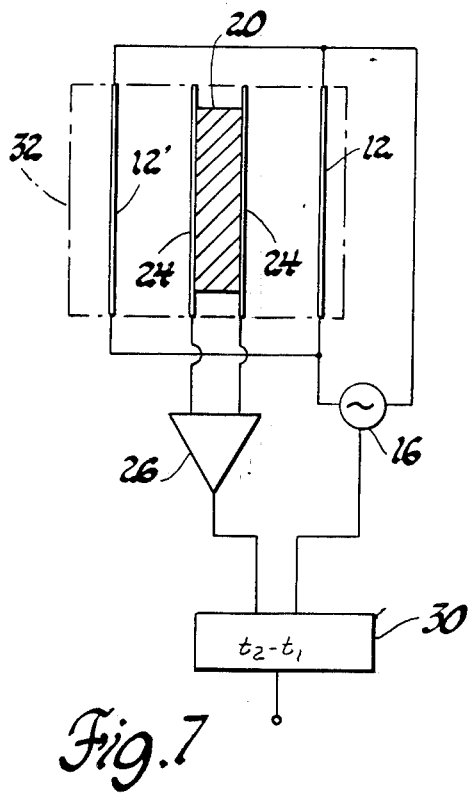
FIG. 7 is a schematic view of an alternative embodiment of the invention.

Another balanced configuration is shown in FIG. 7 wherein two sources of thermal oscillation 12 and 12′ are utilized with a single detector 20 midway between the sources. The current oscillator 16 is coupled to both sources 12,12′, whereas the differential amplifier 26 is connected to the two leads 24 of the detector 20. The timing circuit 30 is responsive to the oscillating current as well as the detector 20 output signal. This configuration has many of the advantages exhibited by the configuration of FIG. 6; however, the FIG. 6 configuration is preferred since it does eliminate the linear temperature gradients in the airstream as a source of noise.

The measured phase of the thermal oscillation is a function of fluid temperature, pressure (of gaseous fluid), and substrate surface condition. To compensate for changes in these parameters, a reference phase measurement can be used. This is accomplished by a secondary sensor on the same or a different substrate as the primary sensor and exposed to still fluid or fluid having a different velocity component perpendicular to the source of the secondary sensor. The detected output of the secondary sensor is compared to that of the primary sensor and the phase difference is independent of changes in the temperature, pressure, and surface conditions.

Figure 8:
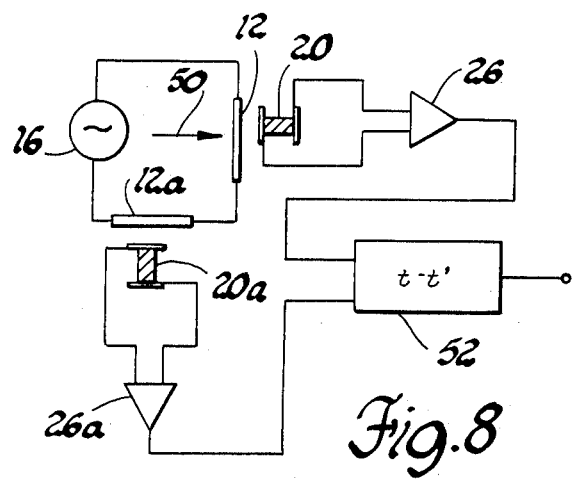
FIG. 8 is a schematic view of still another embodiment of the invention.

FIG. 8 illustrates a sensor arrangement with a "zero reference" and includes an oscillator 16 in series with a source 12, a detector 20 spaced from the source 12, and a differential amplifier 26 coupled to the detector 20 (as shown in FIG. 1), to measure flow perpendicular to the source 12, as indicated by the arrow 50. A reference phase is generated by a secondary sensor having a source 12a in series with the source 12 and the oscillator 16, and a secondary detector 20a spaced from the source 12a by a spacing equal to that between the source 12 and detector 20. The secondary sensor is oriented 90° relative to the primary sensor so that it is insensitive to air flow measured by the primary sensor. A differential amplifier 26a is coupled across the detector 20a to produce a reference signal. A timing circuit 52 compares the outputs of the amplifiers 26 and 26a to produce a signal representing the resultant phase shift or time shift (t−t′) which is a measure of the fluid flow compensated for the effects of fluid temperature, pressure, and surface conditions.

It will thus be seen that the fluid flow sensor according to the invention operates on a principle different from all other solid state sensors and can be fabricated using microelectronic technology. The sensor is physically small and rugged and has the potential to be fabricated on a silicon base that would also have the necessary support electronics so the sensor would be a single integrated device. In addition, the fluid flow sensor of the present invention is not limited in time response to transients by equilibration of temperature between solid and fluid.

The embodiments of the invention for which an exclusive property or privilege is claimed are defined as follows:

1. A gas flow sensor for location contiguous to a body of gaseous fluid subject to flow to be measured, comprising:
a substrate having a thermal diffusivity substantially less than that of the fluid and having a thermal conductivity substantially greater than the fluid;
a thermal oscillation source on the surface of the substrate for generating thermal oscillations in the fluid, whereby thermal oscillations are propagated through still fluid at a first rate and through flowing fluid at a second rate dependent on fluid flow to substrate surface locations spaced from the source;
thermal oscillation detector means on the substrate surface near the oscillation source for providing at least one signal corresponding to the thermal oscillations at the detector means; and
signal responsive means coupled to the detector means for sensing the first and second rates and producing an output correlated to the mass gas flow near the substrate surface.

2. A gas flow sensor for location contiguous to a body of gaseous fluid subject to flow to be measured, comprising:
a substrate having a thermal diffusivity substantially less than that of the fluid and having a thermal conductivity substantially greater than the fluid;
a thermal oscillation source comprising resistor strip means on the surface of the substrate for generating thermal oscillations in the fluid, whereby thermal oscillations are propagated through still fluid at a first rate and through flowing fluid at a second rate dependent on fluid flow to substrate surface locations laterally spaced from the source;
electrical current supply means coupled to the resistor strip means for producing current pulses to energize the thermal oscillation source;
thermal oscillation detector means on the substrate surface laterally spaced from the oscillation source for providing at least one signal corresponding to the thermal oscillations at the detector means; and
signal responsive means coupled to the oscillation source and the detector means for sensing the first and second rates and producing an output correlated to the mass gas flow near the substrate surface.

3. A gas flow sensor for location contiguous to a body of gaseous fluid subject to fow to be measured, comprising:
a substrate having a thermal diffusivity substantially less than that of the fluid and having a thermal conductivity substantially greater than the fluid;
a thermal oscillation source comprising resistor strip means on the surface of the substrate for generating thermal oscillations in the fluid, whereby thermal oscillations are propagated through still fluid at a first rate and through flowing fluid at a second rate dependent on fluid flow to the substrate surface locations laterally spaced from the source;
electrical current supply means coupled to the resistor strip means for producing current pulses to energize the thermal oscillation source;
detectors of the fluid thermal oscillations on the substrate surface laterally spaced from each side of the oscillation source for providing signals corresponding to the thermal oscillations at the detector locations; and
means responsive to the current supply means and the detector signals for sensing the first and second rates and producing an output correlated to the mass gas flow near the substrate surface.

4. A fluid flow sensor for location adjacent a body of fluid subject to flow to be measured, comprising:
a substrate having a thermal diffusivity substantially less than that of the fluid;

a thermal oscillation source comprising a pair of spaced parallel resistor strips on the surface of the substrate for generating thermal oscillations in the fluid, whereby thermal oscillations are propagated through the fluid at a rate dependent on the fluid flow to the substrate surface locations spaced from the source;

electrical current means coupled to the resistor strips for producing current pulses to energize the thermal oscillation source;

a detector of the fluid thermal oscillations on the substrate surface between the resistor strips of the oscillation source for providing a signal corresponding to the thermal oscillations at the detector location; and means responsive to the detector signal for producing an output correlated to the fluid flow near the substrate surface.

5. A fluid flow sensor for location adjacent a body of fluid subject to flow to be measured, comprising:

a polymer film substrate having a thermal diffusivity substantially less than that of the fluid;

a thermal oscillation source comprising a thin film resistor on the surface of the substrate for generating thermal oscillations in the fluid, whereby thermal oscillations are propagated through the fluid at a rate dependent on fluid flow to substrate surface locations spaced from the source;

thin film thermoelectric detector means responsive to the fluid thermal oscillations mounted on the substrate surface near the oscillation source for providing at least one signal corresponding to the thermal oscillations at the detector means location; and means responsive to the detector means signal for producing an output correlated to the fluid flow near the substrate surface.

6. A fluid flow sensor as claimed in claim 5, wherein the polymer film is mounted on a thermally conductive base to allow high thermal oscillation amplitude while maintaining a low maximum source temperature.

7. An air flow sensor for location adjacent an airstream subject to flow to be measured, comprising:

a silicon base for providing sensor heat sink properties;

a polyimide film substrate having a thermal diffusivity substantially less than that of the air mounted on the silicon base;

a thin film elongated thermal oscillation source on the surface of the substrate and thermally coupled to the air for generating thermal oscillations in the air, whereby thermal oscillations are propagated through the air at a rate dependent on air flow to substrate surface locations spaced from the source;

thin film thermoelectric detector means responsive to the air thermal oscillations and mounted on the substrate surface near the oscillation source for providing a signal corresponding to the thermal oscillations at the detector means location; and electronic means responsive to the detector means signal for producing an output correlated to the air flow near the substrate surface.

8. An air flow sensor for location adjacent an airstream subject to flow to be measured, comprising:

a silicon base for providing sensor heat sink properties and adapted to contain integrated circuitry;

a polyimide film substrate having a thermal diffusivity substantially less than that of the air mounted on the silicon base;

a thin film elongated thermal oscillation source on the surface of the substrate and thermally coupled to the air for generating thermal oscillations in the air, whereby thermal oscillations are propagated through the air at a rate dependent on air flow to substrate surface locations spaced from the source;

thin film thermoelectric detector means responsive to the air thermal oscillations and mounted on the substrate surface near the oscillation source for providing a signal corresponding to the thermal oscillations at the detector means location;

integrated circuitry in the silicon base containing oscillator means coupled to the oscillation source; and electronic means coupled to the detector means for producing an output correlated to the air flow near the substrate surface.

9. A fluid flow sensor for location contiguous to a body of fluid subject to flow to be measured, comprising:

a substrate having a thermal diffusivity substantially less than that of the fluid;

a first thermal oscillation source on the surface of the substrate for generating thermal oscillations in the fluid, whereby thermal oscillations are propagated through the fluid at a rate dependent on fluid flow to substrate surface locations spaced from the first source;

first thermal oscillation detector means on the substrate surface near the first oscillation source for providing at least one signal corresponding to the thermal oscillations at the first detector means;

a second thermal oscillation source on the substrate surface for generating thermal oscillations in the fluid, and second thermal oscillation detector means on the substrate surface near the second oscillation source, the second source and second detector means being positioned to detect the propagation of thermal oscillations independently of fluid flow rate for providing a reference signal; and signal responsive means coupled to the first and second detector means for producing an output correlated to the fluid flow near the substrate surface, which output is compensated for temperature and pressure effects on thermal oscillation propagation rate.

10. A fluid flow sensor for location adjacent a body of fluid subject to flow to be measured, comprising:

a polymer film substrate having a thermal diffusivity substantially less than that of the fluid;

a primary thermal oscillation source comprising a thin film resistor on the surface of the substrate for generating thermal oscillations in the fluid, whereby thermal oscillations are propagated through the fluid at a rate dependent on fluid flow to substrate surface locations spaced from the primary source;

primary thin film thermoelectric detector means responsive to the fluid thermal oscillations mounted on the substrate surface near the primary oscillation source for providing at least one primary signal corresponding to the thermal oscillations at the primary detector means location;

a reference thermal oscillation source on the substrate surface for generating thermal oscillations in the fluid and reference thermal oscillation detector means on the substrate surface near the reference oscillation source, the reference source and reference detector means being positioned to detect the propagation of thermal oscillations in a direction having a different component of fluid flow for providing a reference signal; and means responsive to the primary and reference signals for producing an output correlated to the fluid flow near the substrate surface, which output is compensated for temperature and pressure effects.

* * * * *